(12) United States Patent
Fan et al.

(10) Patent No.: US 12,287,925 B2
(45) Date of Patent: Apr. 29, 2025

(54) PROCESSING METHOD AND ELECTRONIC DEVICE

(71) Applicant: Lenovo (Beijing) Limited, Beijing (CN)

(72) Inventors: Fan Fan, Beijing (CN); Liang Zhang, Beijing (CN); Bichao Song, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 3 days.

(21) Appl. No.: 17/941,184

(22) Filed: Sep. 9, 2022

(65) Prior Publication Data
US 2023/0145987 A1 May 11, 2023

(30) Foreign Application Priority Data
Nov. 8, 2021 (CN) .......................... 202111312076.4

(51) Int. Cl.
*G06F 3/147* (2006.01)
*G06F 3/0346* (2013.01)
*G06F 3/0354* (2013.01)

(52) U.S. Cl.
CPC ........ *G06F 3/0346* (2013.01); *G06F 3/03547* (2013.01); *G06F 3/147* (2013.01)

(58) Field of Classification Search
CPC .... G06F 3/0346; G06F 3/03547; G06F 3/147; G06F 1/1626; G06F 1/1694; G06F 1/1698; G06F 3/04883; G06F 3/1454; G06F 3/04847; G06F 3/0488; G09G 2354/00
See application file for complete search history.

(56) References Cited

U.S. PATENT DOCUMENTS

| 8,558,851 | B1* | 10/2013 | Tseng | G09G 5/00 345/619 |
| 9,241,257 | B1* | 1/2016 | Kim | H04M 1/67 |
| 2011/0221667 | A1* | 9/2011 | Lee | G06F 1/1626 324/207.25 |
| 2012/0092332 | A1* | 4/2012 | Tsukahara | G06F 3/04815 345/173 |
| 2013/0069988 | A1* | 3/2013 | Kamei | G06F 1/1637 345/658 |
| 2017/0150227 | A1* | 5/2017 | Kim | G06Q 20/326 |
| 2018/0070122 | A1* | 3/2018 | Baek | H04N 21/4438 |

* cited by examiner

*Primary Examiner* — Lunyi Lao
*Assistant Examiner* — Jarurat Suteerawongsa
(74) *Attorney, Agent, or Firm* — ANOVA LAW GROUP, PLLC (57) ABSTRACT

A processing method includes projecting a display content of an electronic device to a terminal device having a display output module through a connection channel; and acquiring sensing parameters through a gravity sensor. The method further includes in response to determining that the sensing parameters satisfy a support surface placement condition, processing input parameters based on a plane transformation strategy to obtain response parameters, the input parameters obtained by a touch sensing module for a focus displayed in an output area of the display output module. The method further includes controlling, according to the response parameters, a display position of the focus in the output area to respond to a movement operation, a moving direction of the display position of the focus in the output area being consistent with a direction of the movement operation of the operating body with respect to the reference.

20 Claims, 8 Drawing Sheets

PROCESSING METHOD AND ELECTRONIC DEVICE

CROSS-REFERENCE TO RELATED APPLICATION

The present disclosure claims the priority of Chinese Patent Application No. 202111312076.4, filed with the State Intellectual Property Office of P. R. China on Nov. 8, 2021, the entire content of which is incorporated herein by reference.

TECHNICAL FIELD

The present disclosure relates to the field of communication technologies and, in particular, to a processing method and an electronic device.

BACKGROUND

Nowadays, people carry devices such as cellphones as mobile terminals for daily life usage. These devices have increased number of functions and features. By pairing a mobile terminal with a display device such as a monitor and a projection, the touch screen of the mobile terminal can be used as a touch panel to control the cursor of the display device. However, after successful pairing, if the mobile terminal is rotated, the sliding direction of the finger on the touch screen may be inconsistent with the sliding direction of the cursor on the corresponding display.

In view of the above problems, one solution is that the coordinate system where the touch screen is located can be adjusted through an automatic screen rotation function of the mobile terminal, so as to ensure the consistency of the control directions. However, this function has poor applicability. For example, when an electronic device (e.g., a mobile terminal) is placed on a support surface for use, the electronic device cannot detect the change of the position and attitude of the touch screen of the electronic device on the support surface, and the screen rotation function is generally based on rotation according to 90 degrees. In view of this case, for the operation on the touch screen, it is necessary for the electronic device to be able to detect the change of the attitude of the touch screen on the support surface, so as to ensure that the user's movement operation direction relative to the touch screen is consistent with the movement direction of the display position of the focus in the output area of the terminal device, thereby facilitating the user's convenient use.

SUMMARY

In accordance with the disclosure, one aspect of the present disclosure provides a processing method. The method includes projecting a display content of an electronic device to a terminal device having a display output module through a connection channel; and acquiring sensing parameters through a gravity sensor. The method further includes in response to determining that the sensing parameters satisfy a support surface placement condition, processing input parameters based on a plane transformation strategy to obtain response parameters, where the input parameters are obtained by a touch sensing module for a focus displayed in an output area of the display output module. The method further includes controlling, according to the response parameters, a display position of the focus in the output area to respond to a movement operation, a moving direction of the display position of the focus in the output area being consistent with a direction of the movement operation of the operating body with respect to the reference.

Also, in accordance with the disclosure, another aspect of the present disclosure provides an electronic device. The electronic device includes a processor and a memory coupled to the processor and configured to store instructions. When executed by the processor, the instructions cause the processor to: project a display content of the electronic device to a terminal device having a display output module through a connection channel; acquire sensing parameters through a gravity sensor; in response to determining that the sensing parameters satisfy a support surface placement condition, process input parameters based on a plane transformation strategy to obtain response parameters, where the input parameters are obtained by a touch sensing module for a focus displayed in an output area of the display output module; and control, according to the response parameters, a display position of the focus in the output area to respond to a movement operation, a moving direction of the display position of the focus in the output area being consistent with a direction of the movement operation of the operating body with respect to the reference.

Also, in accordance with the disclosure, another aspect of the present disclosure provides a non-transitory storage medium storing computer readable instructions. When executed by a processor, the instructions cause the processor to implement a processing method. The method includes projecting a display content of an electronic device to a terminal device having a display output module through a connection channel; and acquiring sensing parameters through a gravity sensor. The method further includes in response to determining that the sensing parameters satisfy a support surface placement condition, processing input parameters based on a plane transformation strategy to obtain response parameters, where the input parameters are obtained by a touch sensing module for a focus displayed in an output area of the display output module. The method further includes controlling, according to the response parameters, a display position of the focus in the output area to respond to a movement operation, a moving direction of the display position of the focus in the output area being consistent with a direction of the movement operation of the operating body with respect to the reference.

DETAILED DESCRIPTION

Exemplary embodiments of the present disclosure are described in more detail below with reference to the accompanying drawings. While exemplary embodiments of the present disclosure are shown in the drawings, disclosure may be embodied in various forms. The present disclosure should not be limited by the embodiments set forth herein. Rather, these embodiments are provided for thoroughly understanding, and fully convey the scope of the present disclosure to those skilled in the art.

Nowadays, people carry devices such as cellphones as mobile terminals for daily life usage. These devices have increased number of functions and features. By pairing a mobile terminal with a display device such as a monitor and a projection, the touch screen of the mobile terminal can be used as a touch panel to control the cursor of the display device. After successful pairing, the cursor movement on the display of the display device can be controlled in real time through the user's touch operation on the touch screen of the mobile terminal. In order to facilitate the user's touch operation, the mobile terminal is often placed on a support surface such as a surface of the desktop. However, the automatic screen rotation function of the mobile terminal has poor applicability, and the screen rotation function is generally based on rotation according to 90 degrees. Therefore, for the operation on the touch screen, it is necessary for the electronic device to be able to detect the change of the attitude of the touch screen on the support surface, so as to ensure that the user's movement operation direction relative to the touch screen is consistent with the movement direction of the display position of the focus in the output area of the terminal device, thereby facilitating the user's convenient use. To solve the above problem, some embodiments of the present disclosure provides a processing method, which includes the following steps, e.g., shown in FIG. 2.

Figure 2:
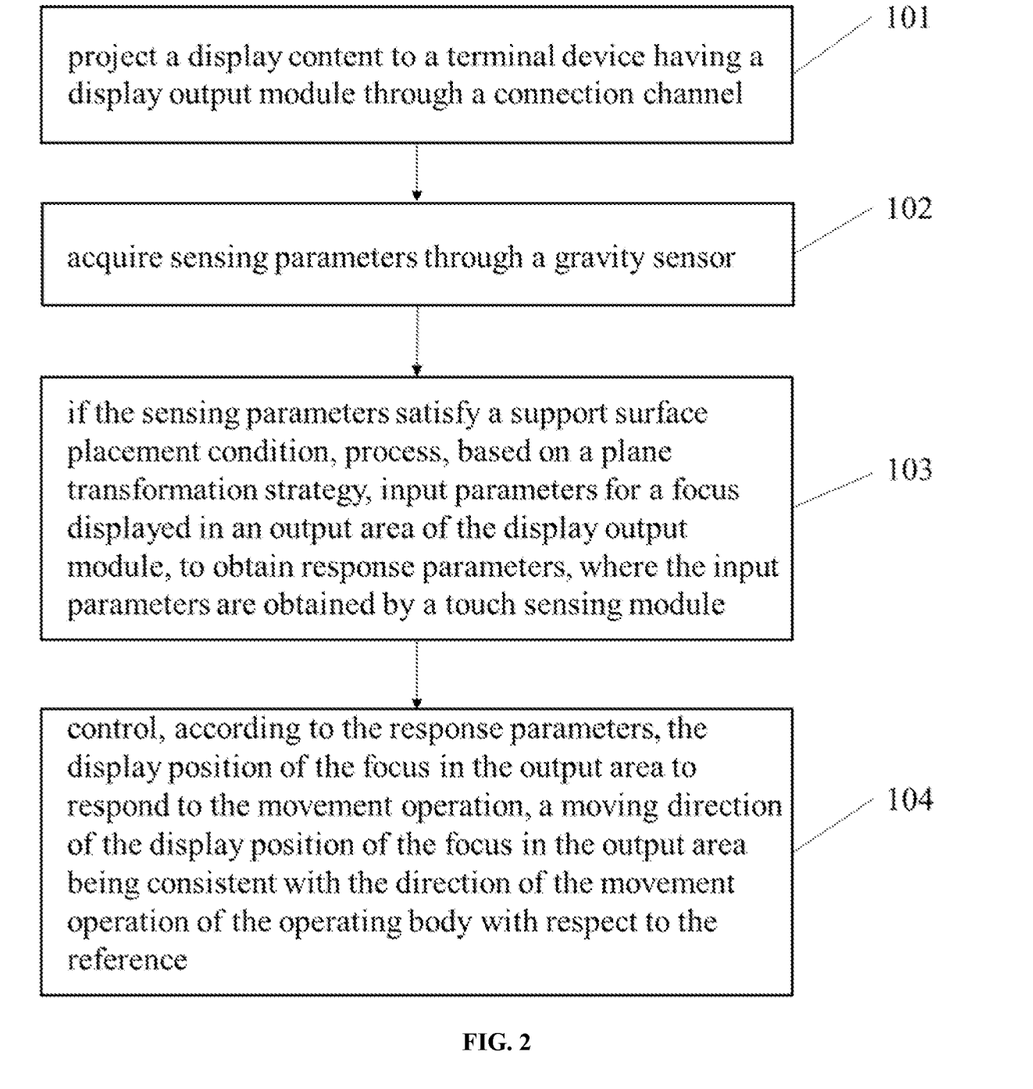
FIG. 2 is a flowchart of a processing method according to some embodiments of the present disclosure.

An electronic device projects a display content to a terminal device having a display output module through a connection channel (101).

In some embodiments, the displayed content belongs to the electronic device. In the embodiments of the present disclosure, the execution subject in each step is the electronic device, and the electronic device includes but is not limited to a tablet computer, a smart phone and another electronic device with touch screen. The terminal device include but is not limited to a computer all-in-one, a smart TV, a projector, and another display device that have a display output module or can realize the screen projection function. After the electronic device is connected to the terminal device, the display content on the touch screen of the electronic device can be projected on the display screen of the terminal device for display. The connection between the electronic device and the terminal device may be an Internet connection or a local area network connection. For example, the connection may be a wired connection or a wireless connection. The embodiments of the present disclosure do not limit the connection manner between the electronic device and the terminal device.

The electronic device acquires sensing parameters through a gravity sensor (102).

In the embodiments of the present disclosure, the gravity sensor may be a built-in sensing component in the electronic device. For example, the gravity sensor may use a space coordinate system in the space where the electronic device is located as a reference, and determine a three-dimensional vector indicating the direction and magnitude of gravity provided by the gravity sensor based on the current attitude of the electronic device. For example, the sensing parameters obtained by the gravity sensor may be a change of the three-dimensional vector. The relative screen orientation of the touch screen of the electronic device in the space can be determined by the change of the sensing parameter.

If the sensing parameters satisfy a support surface placement condition, the electronic device processes, based on a plane transformation strategy, input parameters for a focus displayed in an output area of the display output module, to obtain response parameters, where the input parameters are obtained by a touch sensing module (103).

For example, the input parameters are used to represent a movement operation of an operating body with respect to the reference. In the embodiments of the present disclosure, the operating body refers to an executing body that performs touch operations through the touch sensing module. The operating body may be a user's hand or a stylus held by the user, which is not limited in this application. The input parameters may be a set of input coordinates obtained by the electronic device through the touch sensing module when the user performs a sliding operation on the touch screen of the electronic device through the hand or a stylus. The response parameters may be a set of response coordinates obtained by processing the set of input coordinates obtained by the touch sensing module based on the plane transformation strategy.

Figure 1A:
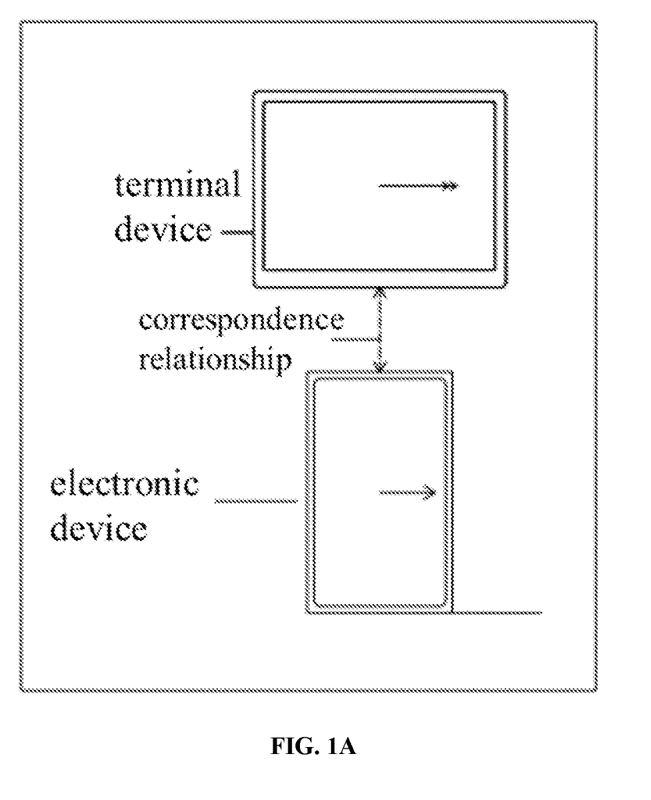
FIG. 1A is a schematic diagram of a comparison of a sliding direction on an electronic device and a moving direction of a focus on a terminal device according to some embodiments of the present disclosure.
Figure 1B:
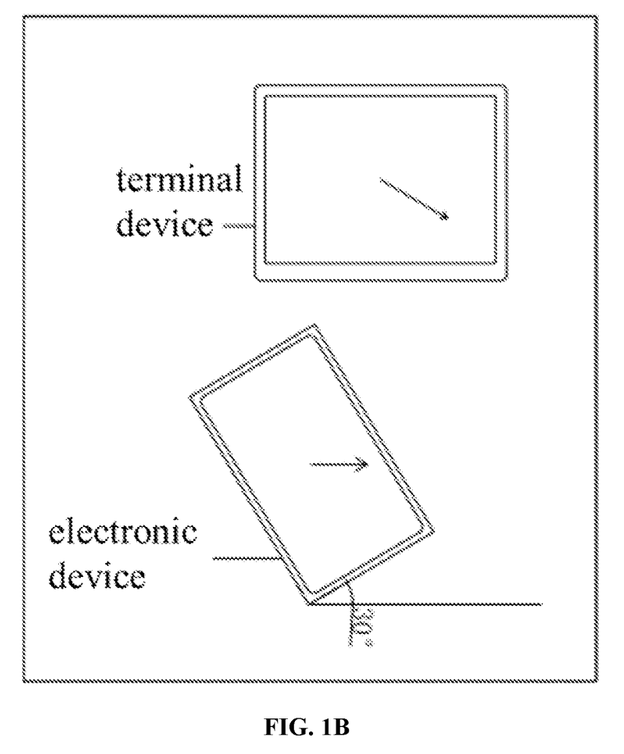
FIG. 1B is a schematic diagram of a comparison of a sliding direction on an electronic device and a moving direction of a focus on a terminal device according to some other embodiments of the present disclosure.

In some embodiments, the reference may be defined with respect to the user who controls the operating body, for example, as shown in FIGS. 1A and 1B.

(1) It can be seen from FIG. 1A that the electronic device is placed on a horizontal desktop and is used by the user in a vertical screen state, where the vertical screen state of the electronic device can be a default reference state when the electronic device is connected to the terminal device. If the user slides horizontally on the touch screen of the electronic device through the operating body, no matter with respect to the user or with respect to the touch screen of the electronic device, the sliding trajectory is horizontal, and the direction of movement of the focus displayed in the output area is also horizontal.

(2) It can be seen from FIG. 1B that the electronic device is rotated by an angle $\theta$ to one side relative to the aforementioned vertical screen state. If the user still slides horizontally on the touch screen on the electronic device according to the sliding direction of (1), with respect to the user, the sliding direction is horizontal. However, with respect to the touch screen of the electronic device, the sliding direction is inclined, and the moving direction of the focus displayed in the output area is also inclined.

Thus, when the placement state of the electronic device on the support surface is at an angle relative to the vertical screen state of the electronic device, the operation direction of the user through the operating body on the touch screen of the electronic device is inconsistent from the moving direction of the focus displayed in the output area of the terminal device.

Figure 1C:
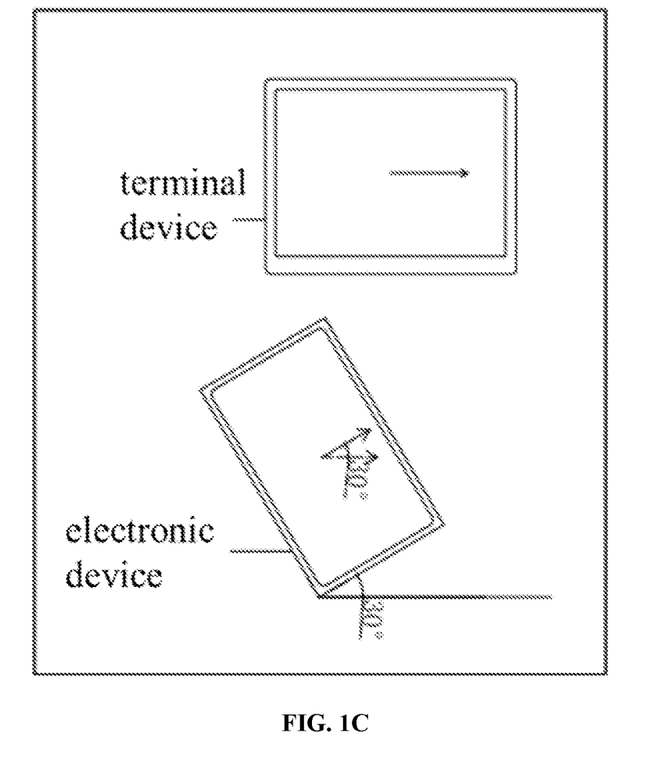
FIG. 1C is a schematic diagram of a comparison of a sliding direction on an electronic device and a moving direction of a focus on a terminal device according to some other embodiments of the present disclosure.

(3) It can be seen from FIG. 1C that the placement states of the electronic device shown in FIGS. B and C are the same. For the situation that occurs in FIG. 1B, in this embodiment of the present disclosure, the touch sensing module in the electronic device can be used to obtain input parameters, and the input parameters are processed through the plane transformation strategy to obtain response parameters. The input parameters are indicated by a dotted line on the electronic device side in FIG. 1C, and the response parameters are indicated by a solid line on the electronic device side and intersecting with the dotted line in FIG. 1C. The angle between the dotted line part and the solid line part is equal to the angle θ. Therefore, the response parameters are indicated by the solid line on the electronic device side in FIG. 1A. Therefore, it is ensured that the operation direction of the user on the touch display screen of the electronic device through the operating body is consistent with the moving direction of the focus displayed in the output area of the terminal device.

The electronic device controls, according to the response parameters, the display position of the focus in the output area to respond to the movement operation, the moving direction of the display position of the focus in the output area being consistent with the direction of the movement operation of the operating body with respect to the reference (104).

In this embodiment of the present disclosure, the shape of the focus includes, but is not limited to, an arrow shape, a circle, a square, a cross, etc. The user can customize it according to the specific operating environment and application requirements. The focus can hide its movement trajectory when its display position changes, or retain its movement trajectory when its display position changes, which is not limited in this application.

For example, when the user needs to perform a sliding operation on the touch screen of the electronic device to control the focus in the output area to perform operations such as marking or text input, the focus can be set as a cross, and the movement trajectory is retained.

According to the processing method and the electronic device provided by the embodiments of the present disclosure, the electronic device projects a display content to a terminal device having a display output module through a connection channel, and acquires sensing parameters through a gravity sensor. If the sensing parameters satisfy a support surface placement condition, the electronic device processes, based on a plane transformation strategy, input parameters for a focus displayed in an output area of the display output module, to obtain response parameters, where the input parameters are obtained by a touch sensing module. The electronic device controls, according to the response parameters, the display position of the focus in the output area to respond to the movement operation. As such, when the electronic device is placed on the support surface for use, the electronic device can detect the change of the attitude of the touch screen on the support surface, so as to ensure that the user's movement operation direction relative to the touch screen is consistent with the movement direction of the display position of the focus in the output area of the terminal device, thereby facilitating the user's convenient use.

Figure 3:
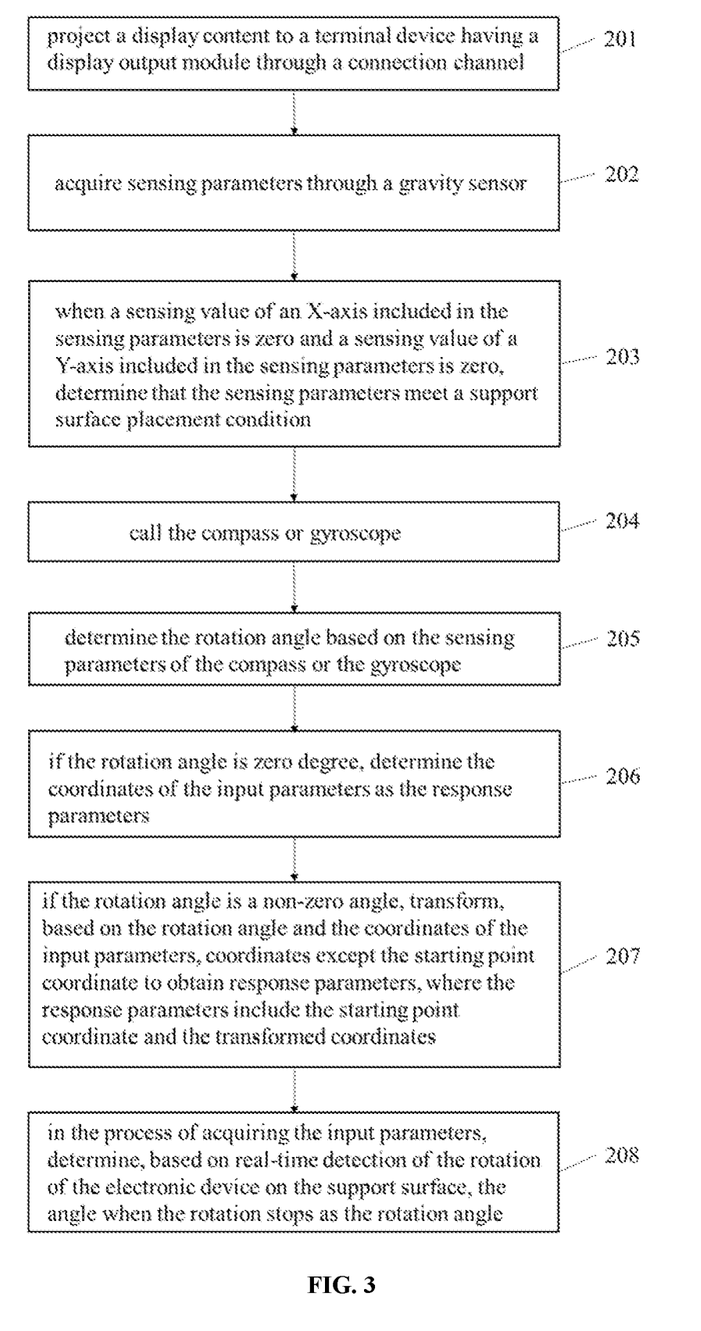
FIG. 3 is a flowchart of a processing method according to some other embodiments of the present disclosure.

Further, as a refinement and expansion of the embodiment shown in FIG. 2, the embodiments of the present disclosure also provide a processing method shown in FIG. 3, which includes the following steps.

An electronic device projects a display content to a terminal device having a display output module through a connection channel (201).

The displayed content belongs to the electronic device.

This step may refer to the description of step 101 in the above method, and the same content is not repeated here.

The electronic device acquires sensing parameters of a gravity sensor (202).

This step may refer to the description of step 102 in the above method, and the same content is not repeated here.

When a sensing value of an X-axis included in the sensing parameters is zero and a sensing value of a Y-axis included in the sensing parameters is zero, the electronic device determines that the sensing parameters meet a support surface placement condition (203).

In the embodiments of the present disclosure, the sensing parameters include a three-dimensional vector indicating a direction and a magnitude of a gravity of the current attitude of the electronic device relative to the space coordinate system, and the three-dimensional vector may be obtained by the gravity sensor in the electronic device. The three-dimensional vector includes the sensing value of the X axis, the sensing value of the Y axis, the sensing value of the Z axis. When the sensing value of the X-axis and the sensing value of the Y-axis are both zero, i.e., the electronic device is parallel to a plane formed by the X-axis and the Y-axis in the space coordinate system, i.e., parallel to the ground plane. Based on the sensing parameters, the electronic device can determine whether the current state of the electronic device satisfies the support surface placement condition, and if so, step 204 is performed.

In some embodiments, in step 204, the sensing parameters may be also used to characterize the motion stability and spatial position of the electronic device. For example, the motion stability may be determined by determining whether the sensing value of the X-axis and the sensing value of the Y-axis in the sensing parameters change within the preset time range. When there is no change within the time range, it can be determined that the electronic device is stable. The spatial position can be determined by whether an included angle between the plane where the touch screen of the electronic device is located and the ground plane is within the preset angle range of the electronic device. The included angle may be an angle between the plane formed by the sensing value of the X-axis and the sensing value of the Y-axis in the sensing parameters and the plane formed by the X-axis and the Y-axis in the spatial coordinates. The automatic rotation function of the electronic device requires the touch screen of the electronic device to be tilted at a certain angle to any side to work. Therefore, when the aforementioned included angle is within the preset angle range of controlling the automatic rotation function in the electronic device, and there is no change within the preset time range, the electronic device can determine the spatial position of the electronic device can satisfy the support surface placement condition. Otherwise, the electronic device can determine that the electronic device satisfies a spatial holding condition, and perform the subsequent operations based on the spatial transformation strategy.

According to the method in this step, by acquiring the sensing value of the X-axis, the sensing value of the Y-axis and the sensing value of the Z-axis in the sensing parameter, it is possible to quickly determine whether the electronic device meets the support surface placement condition, and then the electronic device can determine the plane transformation strategy when the electronic device is placed on the support surface. The plane transformation strategy provides a basis for the subsequent determination of the rotation angle of the electronic device under the support surface placement condition.

The electronic device calls the compass or gyroscope (204).

It should be noted that a compass or a gyroscope may be a built-in component in an electronic device. The gyroscope, also known as an angular velocity sensor, is different from an acceleration sensor. The gyroscope measures the rotational angular velocity when the electronic device is deflected or tilted. In practical applications, it is impossible to measure or reconstruct the complete three-dimensional movement of the deflection or tilt of the electronic device with only the accelerometer. As not being able to measure the rotational movement, the accelerometer can only detect the linear movement of the electronic device along the axis. In contrast, the gyroscope can measure the movement of rotation and deflection very well, so as to accurately analyze and judge the actual movement of the user.

In this embodiment of the present disclosure, after determining that the electronic device meets the support surface placement condition in this step, the electronic device can automatically call the compass or gyroscope individually or simultaneously, which is not limited by the present disclosure. The rotational angular velocity of the electronic device in the horizontal position can be measured by the gyroscope.

The electronic device determines the rotation angle based on the sensing parameters of the compass or the gyroscope (205).

In some embodiments, the rotation angle is obtained when the electronic device satisfies the support surface placement condition. The sensing parameters obtained based on the compass or gyroscope can be processed by the processor preset in the electronic device to obtain the included angle between the current state of the electronic device and the vertical screen state of the touch screen of the electronic device. The included angle is the rotation angle.

According to the method of steps 204-205, when determining that the touch screen of the electronic device meets the support surface placement conditions, the electronic device can call the compass or gyroscope to work, so as to quickly check the current state of the electronic device relative to the vertical screen state of the electronic device. Therefore, it can be avoided that the compass or gyroscope frequently obtains the sensing parameters under the support surface placement condition and interferes with the detection of the rotation angle. As such, the accuracy of the rotation angle obtained by the electronic device can be improved.

If the rotation angle is zero degree, the electronic device determines the coordinates of the input parameters as the response parameters (206).

In this step, if the rotation angle is zero degree, it can be determined that the electronic device is currently in a vertical screen state, that is, the electronic device is not rotated. In this case, the electronic device does not need to process the input parameters through the plane transformation strategy, and can directly use the coordinates of the input parameters as the response parameters. The electronic device may control the display position of the focus in the output area according to the response parameters, to respond to the movement operation. As such, the moving direction of the display position of the focus in the output area is consistent with the direction of the movement operation of the operating body with respect to the reference.

If the rotation angle is a non-zero angle, the electronic device transforms, based on the rotation angle and the coordinates of the input parameters, coordinates except the starting point coordinate to obtain response parameters, where the response parameters include the starting point coordinate and the transformed coordinates (207).

In this step, if the rotation angle is a non-zero angle, it can be determined that the current state of the electronic device has a rotation angle relative to the vertical screen state. At this time, the coordinates of the starting point in the input parameters can be the origin, and based on the reference in step 104 to establish a reference coordinate system. In the reference coordinate system, the X axis of the reference coordinate system is tangent to the ground plane at the current position of the device and approximately points to the east; Y axis is tangent to the ground plane at the current position of the device and points to the magnetic north pole, and Z axis points to the sky and is perpendicular to the ground plane. The reference coordinate system is then rotated around the origin (as the rotation center) according to the rotation angle determined in step 205 to obtain a new coordinate system. Then the coordinates of the input parameters can be mapped to the new coordinate system through the coordinate system transformation principle, and the coordinates of the response parameters can be obtained. As such, the trajectory direction of the coordinate of the response parameters relative to the touch display screen of the electronic device is the trajectory direction of the coordinates of the input parameters shown in FIG. 1A.

According to the method in steps 206-207, the response parameters are obtained by transforming the coordinates of the input parameters except the coordinates of the starting point, and the coordinate trajectory of the input parameters can be transformed into the coordinate trajectory of the response parameters. Under the condition that the starting point position used for the user's sliding operation on the touch screen through the operating body is guaranteed to correspond to the position of the focal in the output area of the terminal device, the moving direction of the display position of the focus in the output area can be consistent with the direction of the movement operation of the operating body relative to the reference.

In the process of acquiring the input parameters, the electronic device determines, based on real-time detection of the rotation of the electronic device on the support surface, the angle when the rotation stops as the rotation angle (208).

In practical applications, when the user performs a sliding operation on the touch screen of the electronic device through the operating body, if the user exerts a large force on the electronic device through the operating body, the electronic device may rotate with the sliding operation on the plane where the electronic device is located. If the rotation angle relative to the vertical screen state of the electronic device before the electronic device is in contact with the operating body is still used for calculation, it can inevitably have a negative impact on the accuracy of transforming input parameters into response parameters. Therefore, it is necessary to re-determine the angle when the rotation of the electronic device stops as the rotation angle, and apply the rotation angle to step 207 to transform the input parameters to obtain accurate response parameters and further improve the accuracy of the transformation calculation.

In a processing method provided by the embodiments of the present disclosure, the electronic device projects a display content to a terminal device having a display output module through a connection channel, and acquires sensing parameters through a gravity sensor. When a sensing value of an X-axis included in the sensing parameters is zero and a sensing value of a Y-axis included in the sensing parameters is zero, the electronic device determines that the sensing parameters meet a support surface placement condition. Then, the electronic device calls the compass or gyroscope and determines the rotation angle based on the sensing parameters of the compass or the gyroscope. If the rotation angle is zero degree, the electronic device determines the coordinate of the input parameters as the response parameters. If the rotation angle is a non-zero angle, the electronic device transforms, based on the rotation angle and the coordinates of the input parameters, coordinates except the starting point coordinate to obtain response parameters. In addition, in the process of acquiring the input parameters, the electronic device determines, based on real-time detection of the rotation of the electronic device on the support surface, the electronic device determines the angle when the rotation stops as the rotation angle. As such, the electronic device can quickly determine whether it is used under the support surface placement condition, and can quickly obtain the rotation angle of the current state of the electronic device relative to its vertical screen state. In addition, the rotation angle can also be re-determined according to whether the electronic device rotates when the user operates on the touch screen of the electronic device through the operating body, thereby improving the accuracy of transforming the input parameters into response parameters. Therefore, it is ensured that the user's movement operation direction relative to the electronic device is consistent with the movement direction of the display position on the terminal device, which is beneficial to the user's convenient use.

Figure 4:
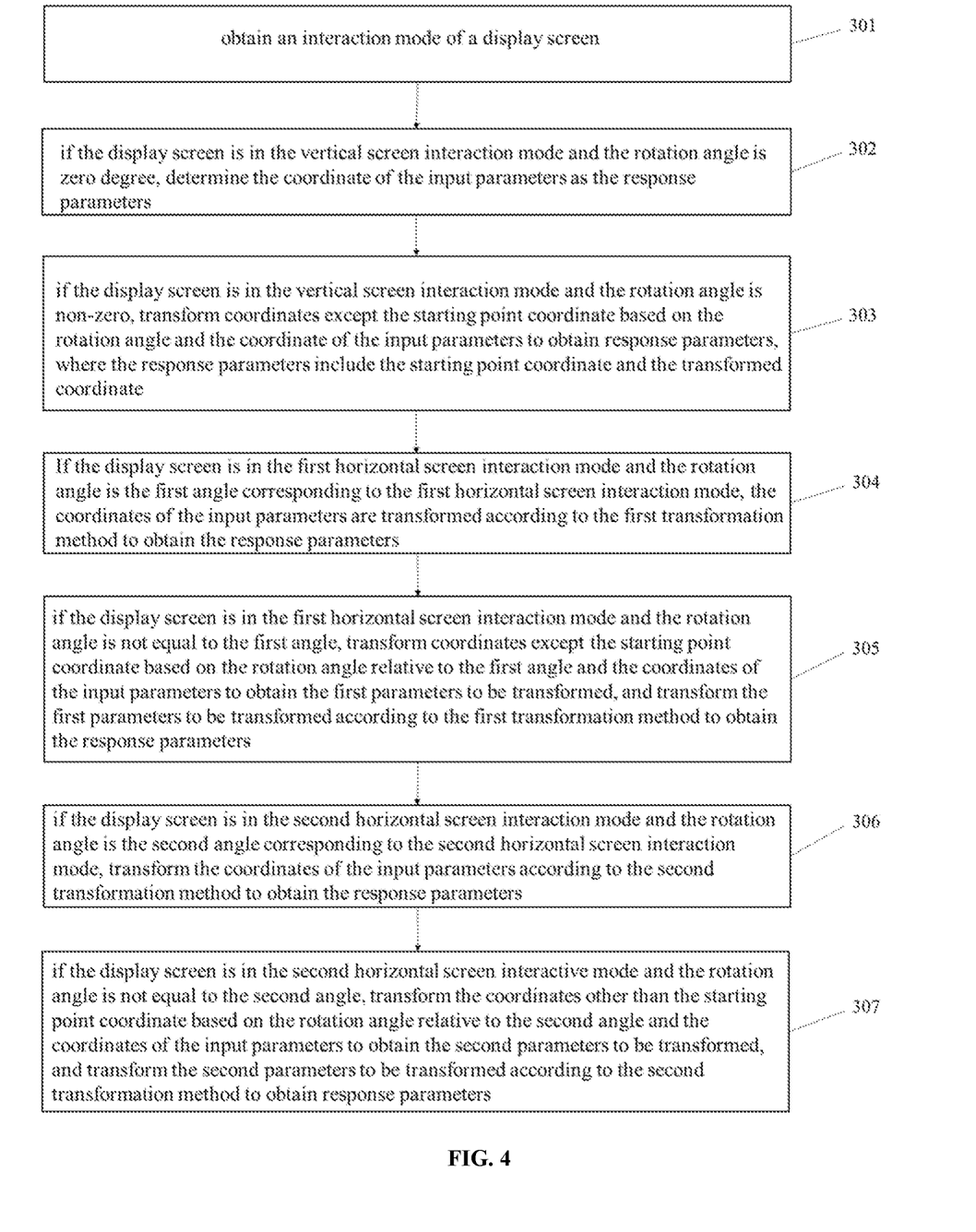
FIG. 4 is a flowchart of a processing method according to some other embodiments of the present disclosure.

Further, as a refinement and expansion of the embodiment shown in the above steps 204-207, to exclude the use of the coordinate transformation strategy in step 207 for transformation when the electronic device is in the horizontal or vertical screen state, one solution is to follow the coordinate rotation strategy when switching between horizontal and vertical screens. Some embodiments of the present disclosure also provide another processing method, as shown in FIG. 4, which includes the following steps.

An electronic device obtains an interaction mode of a display screen (301).

In some embodiments, the interaction mode of the display screen is the coordinates correspondence relationship between the terminal device and the electronic device in the vertical screen state and the horizontal screen state, respectively, after the electronic device is connected to the terminal device. The interaction mode may be obtained and determined during the process of changing the electronic device from the spatial holding state to the support surface placement state. According to the user's usage habits, it can be known that vertical holding and horizontal holding are common holding habits. Therefore, when the user places the electronic device on the support surface for use, the electronic device can automatically determine the horizontal and vertical screen states of the touch screen. For example, the vertical screen state is the application state in which the touch screen is parallel to the Y-axis direction of the reference coordinate system in step 207 when the electronic device is placed vertically (e.g., the electronic device shown in FIG. 1A). The horizontal screen state can be divided into two types, the first one is obtained by rotating the electronic device 90 degrees counterclockwise relative to the vertical screen state; and the second is obtained by rotating the electronic device 90 degrees clockwise relative to the vertical screen state. i.e., an application state in which the horizontally placed electronic device is parallel to the X-axis direction of the reference coordinate system in step 207.

If the display screen is in the vertical screen interaction mode and the rotation angle is zero degree, the electronic device determines the coordinate of the input parameters as the response parameters (302).

For example, when the rotation angle is zero degree, the vertical screen state of the electronic device is the current application state, that is, when the electronic device is vertically placed, it is parallel to the Y-axis direction of the reference coordinate system in step 207. Therefore, it is not necessary to perform coordinate transformation on the coordinates of the input parameters, and the coordinates of the input parameters can be directly used as the coordinates of the response parameters.

If the display screen is in the vertical screen interaction mode and the rotation angle is non-zero, the electronic device transforms coordinates except the starting point coordinate based on the rotation angle and the coordinate of the input parameters to obtain response parameters, where the response parameters include the starting point coordinate and the transformed coordinate (303).

For example, when the rotation angle is non-zero degree, it can be known that there is an included angle between the current application state of the electronic device and the vertical screen state. Therefore, it is necessary to transform the input parameters coordinates into the response parameters coordinates according to the coordinate transformation strategy in step 207.

For example, when the user holds the electronic device vertically and places it on the support surface for use, the interaction mode of the touch display screen of the electronic device when the user holds it vertically is the vertical screen interaction mode. After being placed on the support surface for use, the touch screen of the electronic device, the touch screen display of electronic devices will still use the vertical screen interaction method. If the touch screen of the electronic device is parallel to the Y-axis direction of the reference coordinate system in step 207, then the input parameters are transformed into response parameters using the coordinate transformation strategy corresponding to the vertical screen interaction mode. Otherwise, according to the coordinate transformation strategy in step 207, the input parameters are transformed into response parameters.

According to the method of steps 302-303, by detecting whether the touch screen of the electronic device is in the vertical screen interaction mode and whether the rotation angle is zero degree, it can be quickly determined whether the application state of the electronic device is the vertical screen state, the coordinate transformation strategy corresponding to the vertical screen interaction mode after the electronic device is connected with the terminal device can be directly used to process the input parameters and obtain the response parameters. Thus, the computational burden of coordinate transformation can be reduced, and the mutual interference of different coordinate transformation strategies can be avoided.

If the display screen is in the first horizontal screen interaction mode and the rotation angle is the first angle corresponding to the first horizontal screen interaction mode, the coordinates of the input parameters are transformed according to the first transformation method to obtain the response parameters (304).

For example, the first horizontal screen interaction mode is the coordinate transformation strategy corresponding to the horizontal screen state obtained by rotating the electronic device 90 degrees counterclockwise relative to the vertical screen state described in step 301. It can be seen from the foregoing that the rotation angle is the angle formed by the current state of the electronic device relative to the vertical screen state. Therefore, when the interaction mode corresponding to the touch screen of the electronic device is the first horizontal screen interaction mode, the corresponding first angle is −90. When the first angle is −90 degrees, the coordinates of the input parameters only need to be transformed according to the coordinate transformation strategy corresponding to the first horizontal screen interaction mode to obtain the corresponding coordinates of the response parameters.

If the display screen is in the first horizontal screen interaction mode and the rotation angle is not equal to the first angle, the electronic device transforms coordinates except the starting point coordinate based on the rotation angle relative to the first angle and the coordinates of the input parameters to obtain the first parameters to be transformed, and transforms the first parameters to be transformed according to the first transformation method to obtain the response parameters (305).

In some embodiments, the first parameters to be transformed are obtained based on the coordinate transformation strategy corresponding to the first horizontal screen interaction mode of the touch screen. When the interaction mode corresponding to the touch display screen of the electronic device is the first horizontal screen interaction mode, if the rotation angle is not equal to −90 degrees, the coordinates of the input parameters need to be transformed according to the coordinate transformation strategy in step 207 to obtain the corresponding coordinates of the response parameters.

For example, when the user holds the electronic device horizontally and places the electronic device on a support surface for use, the interaction mode of the touch screen of the electronic device when the user holds the electronic device horizontally is the first horizontal screen interaction mode. When placed on the support surface for use, the touch screen of the electronic device will still use the first horizontal screen interaction method. If the angle formed by the state of the electronic device relative to the vertical screen state at this time is −100 degrees, that is, the electronic device is rotated by −100 degrees relative to its vertical screen state, because the interaction mode corresponding to the touch display screen of the electronic device is the first horizontal screen interaction mode, it is necessary to determine the difference between the rotation angle relative to the vertical screen state (i.e., −100 degrees) and the absolute value of the first angle, and determine whether the difference is positive or negative based on the rotation direction. Therefore, the current state of the electronic device is −10 degrees counterclockwise relative to the first horizontal state described in step 301, then, according to the rotation angle, the coordinates of the input parameters need to be transformed according to the coordinate transformation strategy in step 207 to obtain the corresponding coordinates of the response parameters.

If the display screen is in the second horizontal screen interaction mode and the rotation angle is the second angle corresponding to the second horizontal screen interaction mode, the electronic device transforms the coordinates of the input parameters according to the second transformation method to obtain the response parameters (306).

For example, the second horizontal screen interaction mode is the coordinate transformation strategy corresponding to the horizontal screen state obtained by rotating the electronic device 90 degrees clockwise relative to the vertical screen state described in step 301. It can be seen from the foregoing that the rotation angle is the angle formed by the current state of the electronic device relative to the vertical screen state. Therefore, when the interaction mode corresponding to the touch screen of the electronic device is the second horizontal screen interaction mode, the corresponding second angle is 90 degrees. When the second angle is 90 degrees, the coordinates of the input parameters only need to be transformed according to the coordinate transformation strategy corresponding to the second horizontal screen interaction mode to obtain the corresponding coordinates of the response parameters.

If the display screen is in the second horizontal screen interactive mode and the rotation angle is not equal to the second angle, the electronic device transforms the coordinates other than the starting point coordinate based on the rotation angle relative to the second angle and the coordinates of the input parameters to obtain the second parameters to be transformed, and transforms the second parameters to be transformed according to the second transformation method to obtain response parameters (307).

In some embodiments, the second parameters to be transformed are obtained based on the coordinate transformation strategy corresponding to the second horizontal screen interaction mode of the touch screen. When the interaction mode corresponding to the touch display screen of the electronic device is the second horizontal screen interaction mode, if the rotation angle is not equal to 90 degrees, the coordinates of the input parameters need to be transformed according to the coordinate transformation strategy in step 207 to obtain the corresponding coordinates of the response parameters.

For example, when the user holds the electronic device horizontally and places the electronic device on a support surface for use, the interaction mode of the touch screen of the electronic device when the user holds the electronic device horizontally is the second horizontal screen interaction mode. When being placed on the support surface for use, the touch screen of the electronic device will still use the second horizontal screen interaction mode. If the angle formed by the state of the electronic device relative to the vertical screen state at this time is 100 degrees, that is, the electronic device is rotated by 100 degrees relative to its vertical screen state, because the interaction mode corresponding to the touch display screen of the electronic device is the second horizontal screen interaction mode, it is necessary to determine the difference between the rotation angle relative to the vertical screen state (i.e., 100 degrees) and the absolute value of the first angle, and determine whether the difference is positive or negative based on the rotation direction. Therefore, the current state of the electronic device is 10 degrees clockwise relative to the second horizontal state described in step 301, then, according to the rotation angle, the coordinates of the input parameters need to be transformed according to the coordinate transformation strategy in step 207 to obtain the corresponding coordinates of the response parameters.

According to the method of steps 304-307, by detecting whether the touch screen of the electronic device is in the horizontal screen interaction mode and detection of the rotation angle, it can be quickly determined whether the application state of the electronic device is the horizontal screen state, the coordinate transformation strategy corresponding to the horizontal screen interaction mode after the electronic device is connected with the terminal device can be directly used to process the input parameters to obtain the response parameters. Thus, the computational burden of coordinate transformation can be reduced, and the mutual interference of different coordinate transformation strategies can be avoided Further, some embodiments of the present disclosure further provides an electronic device for implementing the method shown in the foregoing FIG. 2-4.

Figure 5:
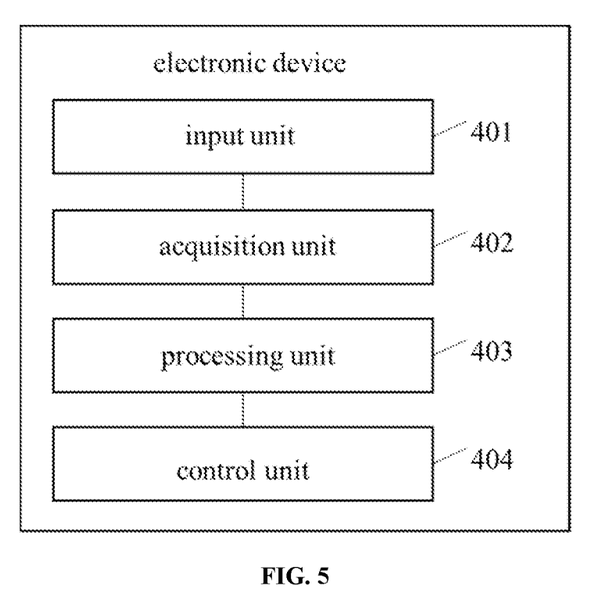
FIG. 5 is a schematic block diagram of an electronic device according to some embodiments of the present disclosure.

This electronic device embodiment corresponds to the foregoing method embodiment. For ease of reading, in the embodiments of the electronic device, details in the foregoing method embodiments are not repeated one by one. However, it should be clear that the electronic device in this embodiment can correspondingly implement all the contents in the foregoing method embodiments. As shown in FIG. 5, the electronic device includes an input unit 401, an acquisition unit 402, a processing unit 403, and a control unit 404.

The input unit 401 is configured to project a display content to a terminal device having a display output module through a connection channel, where the display content belongs to the electronic device.

The acquisition unit 402 is configured to acquire sensing parameters of a gravity sensor.

The processing unit 403 is configured to process, if the sensing parameters obtained by the acquisition unit 402 satisfy the support surface placement condition, input parameters for a focus displayed in an output area of the display output module, to obtain response parameters, where the input parameters are obtained by a touch sensing module. The input parameters are used to represent a movement operation of an operating body relative to a reference.

The control unit 404 is configured to control, according to the response parameters obtained by the processing unit 403, the display position of the focus in the output area to respond to the movement operation, where the moving direction of the display position of the focus in the output area is consistent with the direction of the movement operation of the operating body with respect to the reference.

Figure 6:
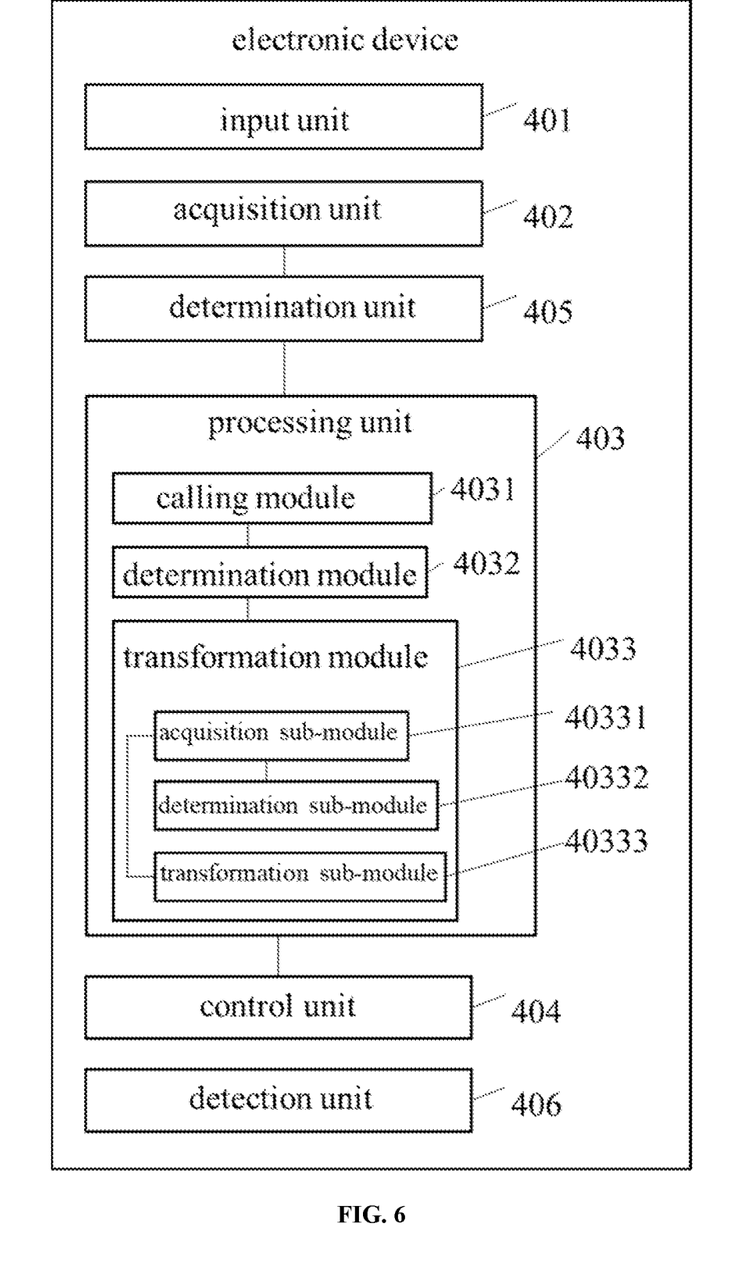
FIG. 6 is a schematic block diagram of an electronic device according to some other embodiments of the present disclosure.

Further, as shown in FIG. 6, the processing unit 403 is further configured to, if the sensing parameters obtained by the acquisition unit 402 satisfy the spatial holding condition, process the input parameters for the focus displayed in the output area of the display output module obtained through the touch sensing module based on a spatial transformation strategy.

Further, as shown in FIG. 6, the sensing parameters obtained by the acquisition unit 402 include a sensing value of the X axis, a sensing value of the Y axis, a sensing value of the Z axis.

The electronic device further includes a determination unit 405 configured to determine, when the sensing value of the X-axis included in the sensing parameters is zero and the sensing value of the Y-axis included in the sensing parameters is zero, that the sensing parameters meet a support surface placement condition.

Further, as shown in FIG. 6, the processing unit 403 includes a calling module 4031, a determination module 4032, and a transformation module 4033.

The calling module 4031 is configured to call the compass or gyroscope.

The determination module 4032 configured to determine the rotation angle based on the sensing parameters obtained the compass or gyroscope called by the calling module 4031.

The transformation module 4033 configured to transform the coordinates except the starting point coordinate based on the rotation angle obtained by the determining module 4032 and the coordinate of the input parameters to obtain response parameters, where the response parameters include the coordinates of the starting point and the transformed coordinates.

Further, as shown in FIG. 6, the processing unit 403 further includes a determination module 4032 and a transformation module 4033.

The determination module 4032 is configured to, if the rotation angle is zero, determine the coordinates of the input parameters as the response parameters.

The transformation module 4033 is configured to, if the rotation angle is greater than zero degree, transform coordinates other than the coordinates of the starting point based on the rotation angle determined by the determining module 4032 and the coordinates of the input parameters to obtain the response parameters, where the response parameters include the coordinates of the starting point and the transformed coordinates.

Further, as shown in FIG. 6, the transformation module 4033 also includes an acquisition sub-module 40331, a determination sub-module 40332, and a transformation sub-module 40333.

The acquisition sub-module 40331 is configured to acquire an interaction mode of the display screen.

The determination sub-module 40332 is configured to, if the interaction mode of the display screen acquired by the acquisition sub-module 40331 is in a vertical screen interaction mode and the rotation angle is zero degree, determine the coordinates of the input parameters as the response parameters.

The transformation sub-module 40333 is configured to, if the interaction mode of the display screen acquired by the acquisition sub-module 40331 is in the vertical screen interaction mode and the rotation angle is non-zero degree, transform the coordinates other than the starting point coordinate to obtain the response parameters based on the rotation angle and the coordinates of the input parameters. The response parameters include the coordinates of the starting point and the transformed coordinates.

Further, as shown in FIG. 6, the transformation module also includes a transformation sub-module 40333.

The transformation sub-module 40333 is configured to, if the interaction mode of the display screen acquired by the acquisition sub-module 40331 is in the first horizontal screen interaction mode and the rotation angle is the first angle corresponding to the first horizontal screen interaction mode, transform the coordinates of the input parameters according to a first transformation method to obtain the response parameters.

The transformation sub-module 40333 is further configured to, if the interaction mode of the display screen acquired by the acquisition sub-module 40331 is in the first horizontal screen interaction mode and the rotation angle is not equal to the first angle, determine the first parameters to be transformed by transforming coordinates except the starting point coordinate based on the rotation angle relative to the first angle and the coordinates of the input parameters, and transform the first parameters to be transformed according to the first transformation method to obtain the response parameters.

The transformation sub-module 40333 is also configured to, if the interaction mode of the display screen acquired by the acquisition sub-module 40331 is in the second horizontal screen interaction mode and the rotation angle is the second angle corresponding to the second horizontal screen interaction mode, transform the coordinates of the input parameters according to the second transformation method to obtain the response parameters.

The transformation sub-module 40333 is configured to, if the interaction mode of the display screen acquired by the acquisition sub-module 40331 is in the second horizontal screen interaction mode and the rotation angle is not equal to the second angle, obtain the second parameters to be transformed by transforming coordinates except the starting point coordinate based on the rotation angle relative to the second angle and the coordinates of the input parameters, and transforming the second parameters to be transformed according to the second transformation method to obtain the response parameters.

Further as shown in FIG. 6, the electronic device also includes a detection unit 406.

The detection unit 406 is further configured to, in the process of acquiring the input parameters, based on real-time detection of the rotation of the electronic device in the support surface, detect the angle when the rotation stops as the rotation angle.

As will be appreciated by those skilled in the art, the embodiments of the present disclosure may be provided as a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage media (including, but not limited to, disk storage, CD-ROM, optical storage, etc.) having computer-usable program code embodied therein.

The present disclosure is described with reference to flowchart illustrations and/or block diagrams of methods, apparatus (systems), and computer program products according to embodiments of the present disclosure. It will be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general purpose computer, special purpose computer, embedded processor or other programmable data processing device to produce a machine, such that execution of instructions by a processor of a computer or other programmable data processing device can produce means for implementing the functions specified in one or more of the flowcharts and/or one or more blocks of the block diagrams.

These computer program instructions may also be stored in a computer-readable memory capable of directing a computer or other programmable data processing apparatus to function in a particular manner, such that the instructions stored in the computer-readable memory result in an article of manufacture including instruction means, and the instruction means implements the functions specified in the flow or flow of the flowchart and/or the block or blocks of the block diagram.

These computer program instructions can also be loaded on a computer or other programmable data processing device to cause a series of operational steps to be performed on the computer or other programmable device to produce a computer-implemented process to provide steps for implementing the functions specified in one or more of the flowcharts and/or one or more blocks of the block diagrams.

In a typical configuration, a computing device may include one or more processors (e.g., CPUs), input/output interfaces, network interfaces, and memory.

Memory may include non-permanent memory in computer readable media, random access memory (RAM) and/or non-volatile memory, etc., for example, read only memory (ROM) or flash memory (flash RAM). The memory is an example of a computer-readable medium.

Computer-readable media includes both permanent and non-permanent, removable and non-removable media, and storage of information may be implemented by any method or technology. Information may be computer readable instructions, data structures, modules of programs, or other data. Examples of computer storage media include, but are not limited to, phase-change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic tape cassettes, magnetic tape magnetic disk storage or other magnetic storage devices or any other non-transmission medium that can be used to store information that can be accessed by a computing device. As defined herein, computer-readable media does not include transitory computer-readable media, such as modulated data signals and carrier waves.

From the description of the above embodiments, those skilled in the art can clearly understand that the present disclosure can be implemented by means of software plus necessary general-purpose hardware, and of course hardware can also be used, but in many cases the former may be a better implementation manner. Based on this understanding, the technical solutions of the present disclosure can be embodied in the form of software products in essence, or the parts that make contributions to the prior art. The computer software products are stored in a readable storage medium, such as a floppy disk, a hard disk, or an optical disk of a computer, including several instructions to make a computer device (e.g., a personal computer, a server, or a network device, etc.) execute the methods described in the various embodiments of the present application The above descriptions are only specific implementations of the present application, but the protection scope of the present application is not limited thereto. Any person skilled in the art can easily think of changes or substitutions within the technical scope disclosed in the present application, which should be covered by the protection scope of the present application. Therefore, the protection scope of this application should be subject to the protection scope of the claims.

What is claimed is:

1. A processing method comprising:
projecting a display content displayed on a screen of an electronic device to a display output module of a terminal device through a connection channel, the electronic device includes a gravity sensor and a touch sensing module;
acquiring sensing parameters through the gravity sensor;
in response to determining that the electronic device is placed on a support surface based on the sensing parameters:
determining a rotation angle of the electronic device about an axis perpendicular to the support surface based on the sensing parameters; and
in response to determining that the rotation angle of the electronic device about the axis perpendicular to the support surface is a non-zero angle, processing input parameters based on the rotation angle of the electronic device about the axis perpendicular to the support surface, to obtain response parameters, the input parameters being parameters of a movement operation performed by an operator on a touch screen of the touch sensing module, and the response parameters being adjusted input parameters based on the non-zero angle; and
controlling, according to the response parameters, a display position of a focus in an output area of the display output module to respond to the movement operation, a moving direction of the display position of the focus in the output area being consistent with a direction of the response parameters relative to the touch screen of the touch sensing module.

2. The method of claim 1, further comprising:
in response to determining that the sensing parameters satisfy a spatial holding condition, processing the input parameters based on a spatial transformation strategy.

3. The method of claim 1, wherein:
the sensing parameters include a sensing value of an X axis, a sensing value of a Y axis, a sensing value of a Z axis;
the method further comprising:
in response to determining that the sensing value of the X-axis and the sensing value of the Y-axis included in the sensing parameters is zero, determining that the electronic device is placed on the support surface.

4. The method of claim 1, further comprising:
calling a compass or gyroscope; and
determining the rotation angle according to detection of the compass or the gyroscope.

5. The method of claim 4, further comprising:
in a process of acquiring the input parameters, based on real-time detection of rotation of the electronic device about the axis perpendicular to the support surface, detecting an angle when the rotation stops as the rotation angle.

6. The method of claim 1, further comprising:
in response to determining that the rotation angle of the electronic device about the axis perpendicular to the support surface is zero degree, determining the input parameters as the response parameters;
wherein in response to determining that the rotation angle of the electronic device about the axis perpendicular to the support surface is the non-zero angle, processing the input parameters to obtain the response parameters includes:
in response to determining that the rotation angle is the non-zero angle, transforming, based on the rotation angle and the input parameters, coordinates included in the input parameters except a starting point coordinate to obtain transformed coordinates; and
determining the response parameters, the response parameters including the starting point coordinate and the transformed coordinates.

7. The method of claim 1, further comprising:
obtaining an interaction mode of a display screen;
in response to determining that the display screen is in a vertical screen interaction mode and the rotation angle is zero degree, determining the input parameters as the response parameters; and
in response to determining that the display screen is in the vertical screen interaction mode and the rotation angle is the non-zero angle, transforming, based on the rotation angle and the input parameters, the coordinates included in the input parameters except the starting point coordinate to obtain the response parameters.

8. The method of claim 7, wherein the interaction mode includes a vertical screen interaction mode and a horizontal screen interaction mode.

9. The method of claim 7, further comprising:
in response to determining that the display screen is in a first horizontal screen interaction mode and the rotation angle is a first angle corresponding to the first horizontal screen interaction mode, transforming the coordinates included in the input parameters according to a first transformation method to obtain the response parameters; and
in response to determining that the display screen is in the first horizontal screen interaction mode and the rotation angle is not equal to the first angle, obtaining, based on the rotation angle relative to the first angle and the coordinates of the input parameters, first parameters to be transformed by transforming coordinates included in the input parameters except the starting point coordinate, and transforming the first parameters to be transformed according to the first transformation method to obtain the response parameters.

10. The method of claim 7, further comprising:
in response to determining that the display screen is in a second horizontal screen interaction mode and the rotation angle is a second angle corresponding to the second horizontal screen interaction mode, transforming the coordinates included in the input parameters according to a second transformation method to obtain the response parameters; and
in response to determining that the display screen is in the second horizontal screen interaction mode and the rotation angle is not equal to the second angle, obtaining, based on the rotation angle relative to the second angle and the coordinates of the input parameters, second parameters to be transformed by transforming coordinates included in the input parameters except the starting point coordinate, and transforming the second parameters to be transformed according to the second transformation method to obtain the response parameters.

11. The method of claim 1, further comprising:
determining an included angle between the electronic device and a ground plane based on the sensing parameters; and
in response to determining that the included angle is within a preset angle range and does not change within a preset time range, determining that the electronic device is placed on the support surface.

12. The method of claim 1, further comprising:
in response to determining that the electronic device is not placed on the support surface, processing the input parameters based on a spatial transformation strategy to obtain the response parameters.

13. The method of claim 1, wherein determining the rotation angle of the electronic device about the axis perpendicular to the support surface includes:
in response to determining that the electronic device rotates about the axis perpendicular to the support surface while the movement operation of the operation body is performed, determining, when the electronic device stops rotating, the rotation angle of the electronic device about the axis perpendicular to the support surface.

14. An electronic device comprising:
a gravity sensor;
a touch sensing module;
a processor;
a memory coupled to the processor and configured to store instructions, wherein when executed by the processor, the instructions cause the processor to:
project a display content displayed on a screen of the electronic device to a display output module of a terminal device through a connection channel;
acquire sensing parameters through the gravity sensor;

in response to determining that the electronic device is placed on a support surface based on the sensing parameters:
　determine a rotation angle of the electronic device about an axis perpendicular to the support surface based on the sensing parameters; and
　in response to determining that the rotation angle of the electronic device about the axis perpendicular to the support surface is a non-zero angle, process input parameters based on the rotation angle of the electronic device about the axis perpendicular to the support surface, to obtain response parameters, the input parameters being parameters of a movement operation performed by an operator on a touch screen of the touch sensing module, and the response parameters being adjusted input parameters based on the non-zero angle; and
control, according to the response parameters, a display position of a focus in an output area of the display output module to respond to the movement operation, a moving direction of the display position of the focus in the output area being consistent with a direction of the response parameters relative to the touch screen of the touch sensing module.

15. The electronic device of claim 14, wherein when executed by the processor, the instructions further cause the processor to:
process, in response to determining that the sensing parameters satisfy a spatial holding condition, the input parameters based on a spatial transformation strategy.

16. The electronic device of claim 14, wherein:
the sensing parameters include a sensing value of an X axis, a sensing value of a Y axis, a sensing value of a Z axis; and
when executed by the processor, the instructions further cause the processor to:
　in response to determining that the sensing value of the X-axis and the sensing value of the Y-axis included in the sensing parameters is zero, determine that the electronic device is placed on the support surface.

17. The electronic device of claim 14, wherein when executed by the processor, the instructions further cause the processor to:
call a compass or gyroscope; and
determine the rotation angle according to detection of the compass or the gyroscope.

18. The electronic device of claim 17, when executed by the processor, the instructions further cause the processor to:
in a process of acquiring the input parameters, based on real-time detection of rotation of the electronic device about the axis perpendicular to the support surface, detect an angle when the rotation stops as the rotation angle.

19. The electronic device of claim 14, wherein when executed by the processor, the instructions further cause the processor to:
in response to determining that the rotation angle of the electronic device about the axis perpendicular to the support surface is zero degree, determine the input parameters as the response parameters; and
in response to determining that the rotation angle is the non-zero angle;
　transform, based on the rotation angle and the input parameters, coordinates included in the input parameters except a starting point coordinate to obtain transformed coordinates; and
　determine the response parameters, the response parameters including the starting point coordinate and the transformed coordinates.

20. A non-transitory storage medium storing computer readable instructions, wherein when executed by a processor, the instructions cause the processor to implement a processing method including:
projecting a display content displayed on a screen of an electronic device to a display output module of a terminal device through a connection channel, the electronic device includes a gravity sensor and a touch sensing module;
acquiring sensing parameters through the gravity sensor;
in response to determining that the electronic device is placed on a support surface based on the sensing parameters:
　determining a rotation angle of the electronic device about an axis perpendicular to the support surface based on the sensing parameters; and
　in response to determining that the rotation angle of the electronic device about the axis perpendicular to the support surface is a non-zero angle, processing input parameters based on the rotation angle of the electronic device about the axis perpendicular to the support surface, to obtain response parameters, the input parameters being parameters of a movement operation performed by an operator on a touch screen of the touch sensing module, and the response parameters being adjusted input parameters based on the non-zero angle; and
controlling, according to the response parameters, a display position of a focus in an output area of the display output module to respond to the movement operation, a moving direction of the display position of the focus in the output area being consistent with a direction of the response parameters relative to the touch screen of the touch sensing module.

* * * * *